United States Patent
Allgaier

(10) Patent No.: US 8,113,309 B2
(45) Date of Patent: Feb. 14, 2012

(54) METHOD FOR OPERATING A DRIVETRAIN

(75) Inventor: Bernd Allgaier, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 330 days.

(21) Appl. No.: 12/496,696

(22) Filed: Jul. 2, 2009

(65) Prior Publication Data

US 2010/0018790 A1 Jan. 28, 2010

(30) Foreign Application Priority Data

Jul. 24, 2008 (DE) .......................... 10 2008 040 664

(51) Int. Cl.
*B60W 10/02* (2006.01)
(52) U.S. Cl. ................ 180/65.265; 180/65.25; 903/946; 477/5
(58) Field of Classification Search .............. 180/65.21, 180/65.25, 65.26, 65.275, 65.28, 65.285, 180/65.265; 903/912, 914, 946; 701/22; 123/179.3, 179.4, 179.25, 179.28; 477/3, 477/5, 6

See application file for complete search history.

(56) References Cited

U.S. PATENT DOCUMENTS

| | | | | | |
|---|---|---|---|---|---|
| 5,713,425 A | * | 2/1998 | Buschhaus et al. | ........ | 180/65.25 |
| 5,826,671 A | * | 10/1998 | Nakae et al. | ............. | 180/65.235 |
| 6,543,561 B1 | * | 4/2003 | Pels et al. | .................... | 180/65.23 |
| 6,735,502 B2 | * | 5/2004 | Phillips et al. | .................. | 701/22 |
| 7,610,891 B2 | * | 11/2009 | Seufert et al. | ............ | 123/179.25 |
| 7,762,922 B2 | * | 7/2010 | Dreibholz et al. | ................ | 477/5 |

* cited by examiner

*Primary Examiner* — John Walters
(74) *Attorney, Agent, or Firm* — Davis & Bujold, P.L.L.C.

(57) ABSTRACT

A method for operating a drivetrain of a motor vehicle. The drivetrain includes at least a hybrid drive with an internal combustion engine and an electric motor, a clutch arranged between the internal combustion engine and the electric motor, and a transmission arranged between the hybrid drive and a drive output. When the vehicle is at rest, the clutch arranged between the internal combustion engine and the electric motor is filled at least with filling pressure and then, when the vehicle is started, if the starting torque desired by the driver is above a limit value, the internal combustion engine is immediately turned over and started up by the electric motor, whereas, when starting, if the starting torque desired by the driver is below the limit value, then on starting, the internal combustion engine is not turned over by the electric motor.

9 Claims, 1 Drawing Sheet

METHOD FOR OPERATING A DRIVETRAIN

This application claims priority from German patent application serial no. 10 2008 040 664.3 filed Jul. 24, 2008.

FIELD OF THE INVENTION

The invention concerns a method for operating a drivetrain of a motor vehicle, that comprises at least a transmission and a hybrid drive.

BACKGROUND OF THE INVENTION

The main components of a drivetrain of a motor vehicle are a drive assembly and a transmission. The transmission converts torques and rotation speeds, and transmits the traction force supplied by the drive assembly. The present invention concerns a method for operating a drivetrain that comprises at least a transmission and, as its drive assembly, a hybrid drive with an internal combustion engine and an electric motor.

In a drivetrain with a so-termed parallel hybrid drive, a clutch is positioned between the internal combustion engine and the electric motor of the hybrid drive, by means of which the internal combustion engine of the hybrid drive can be decoupled from drive output of the drivetrain. When such a drivetrain with a parallel hybrid drive is started up, typically the internal combustion engine is off and the clutch between it and the electric motor is disengaged. In such a case one also speaks of a purely electric-motor-powered start.

Then, when during starting a starting torque desired by the driver exceeds the maximum starting torque that can be furnished by the electric motor, the internal combustion engine has to be started. To do this, the clutch between the internal combustion engine and the electric motor must be at least partially engaged so that the combustion engine can be turned over and started by the electric motor.

Furthermore, it is then necessary to match the speed of the internal combustion engine to that of the electric motor and make a connection between them. This is made possible by appropriately controlling of the clutch between the internal combustion engine and the electric motor, and if needs be, by acting upon the motor itself.

Especially if, directly from when the vehicle is at rest, the driver desires a high starting torque, this procedure known from the prior art for starting a motor vehicle with a parallel hybrid drive can result in a relatively long delay before the internal combustion engine has been started up and is supplying torque to the drive output. This is perceived by the driver as disadvantageous. A method is therefore needed for operating a drivetrain with a parallel hybrid drive, in which even when the driver desires a high starting torque directly from when the vehicle is at rest, the internal combustion engine can be started up within the shortest possible time so as to supply the drive output with the starting torque desired.

SUMMARY OF THE INVENTION

On that basis the present invention addresses the problem of providing a new type of method for operating a drivetrain that comprises a transmission and a hybrid drive. According to the invention, when the vehicle is at rest, the clutch positioned between the internal combustion engine and the electric motor is filled at least to its filling pressure so that if, when starting, the driver desires a starting torque which is above a certain limit value, then when the vehicle is started, the internal combustion engine can be turned over and started up immediately by the electric motor, whereas if, when starting, the starting torque desired by the driver is below the limit value, then when the vehicle is started the electric motor does not turn over the combustion engine.

With the method according to the invention, when the driver desires high starting torque directly from when the vehicle is at rest, the combustion engine is started and the desired starting torque is furnished to the drive output within the shortest possible time. In any event, compared with the prior art the time it takes according to the prior art to fill the clutch between the electric motor and the internal combustion engine up to its full pressure and to synchronize the electric motor and the combustion engine, is not longer needed.

BRIEF DESCRIPTION OF THE DRAWINGS

Preferred further developments of the invention emerge from the subordinate claims and from the description given below. Example embodiments of the invention, to which it is not limited, are explained with reference to the drawing, which shows:

DETAILED DESCRIPTION OF THE PREFERRED EMBODIMENTS

The present invention concerns a method for operating a drivetrain of a motor vehicle that comprises at least a transmission and a hybrid drive.

Figure 1:
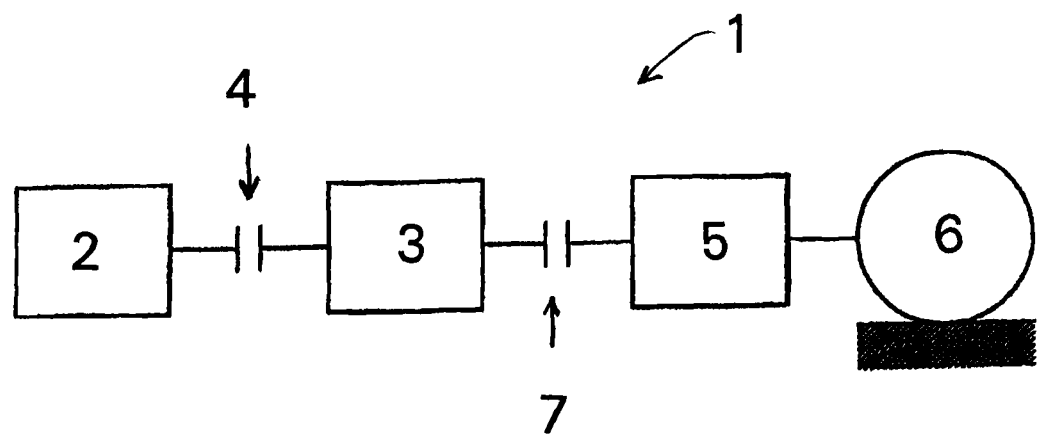
FIG. 1: Diagrammatic representation of a motor vehicle drivetrain in which the method according to the invention can be used.

FIG. 1 shows as an example a diagram of a motor vehicle drivetrain in which the method according to the invention can be used. Thus, FIG. 1 shows a layout of a motor vehicle drivetrain 1, the drivetrain 1 in FIG. 1 comprising a hybrid drive that consists of an internal combustion engine 2 and an electric motor 3.

Between the internal combustion engine 2 and the electric motor 3 is arranged a clutch 4, which is disengaged when the drivetrain is powered exclusively by the electric motor 3.

In addition to the hybrid drive, the drivetrain 1 in FIG. 1 also has a transmission 5 which transmits the traction force supplied by the hybrid drive to a drive output 6 of the drivetrain, namely the wheels to be driven. The transmission can be made for example as an automatic transmission or an automated transmission. In an automatic transmission, gearshifts are carried out without traction force interruption, while in an automated transmission they take place with traction force interruption.

In the drivetrain of FIG. 1 a further clutch 7 is arranged between the electric motor 3 of the hybrid drive and the transmission 5. This clutch 7 serves as a starting element external to the transmission during electric-motor-powered starts.

Figure 2:
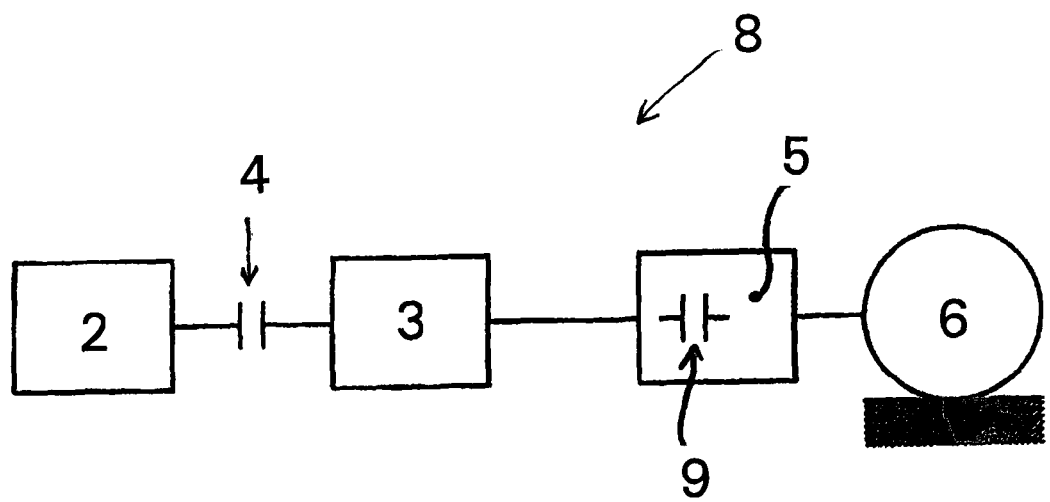
FIG. 2: An alternative motor vehicle drivetrain in which the method according to the invention can be used

FIG. 2 shows as an example another motor vehicle drivetrain layout in which the method according to the invention can be used. The drivetrain 8 whose layout is shown in FIG. 2 differs from the drivetrain in FIG. 1, in that the clutch 7 or transmission-external starting element is omitted, and replaced by a transmission-internal starting element 9.

The present invention concerns a method for operating such a drivetrain with a transmission and a hybrid drive, or to be specific, the details that relate to starting off from when the vehicle is at rest.

In the sense of the present invention it is proposed that while the vehicle is at rest, the clutch 4 arranged between the internal combustion engine 2 and the electric motor 3 should be filled at least to its filling pressure.

When the clutch 4 is filled to its filling pressure, the clutch 4 is at its so-termed contact point or 'touch point', in which it can just transmit a drag torque and, when correspondingly actuated, can produce a torque immediately without any further delay time.

So if, when starting off, the starting torque desired by the driver is above a limit value, then on starting, the internal combustion engine 2 is immediately turned over and started up by the electric motor 3. In contrast if, when starting off, the starting torque desired by the driver is below the limit value, then on starting, the internal combustion engine 2 is not turned over by the electric motor 3. The starting torque desired by the driver is deduced from the position of the accelerator pedal. As an additional evaluation criterion the accelerator pedal angle can be used.

In a first variant of the method according to the invention it is assumed that when the vehicle is at rest the clutch 4 arranged between the internal combustion engine 2 and the electric motor 3 is filled to its filling pressure and hence to its touch point, so that the clutch 4 can just transmit a drag torque. Then, when in this case the starting torque desired by the driver is above the limit value, in order to turn over and start up the internal combustion engine 2 by means of the electric motor 3 immediately or directly and without any further delay the clutch 4 arranged between the internal combustion engine 2 and the electric motor 3 is either fully engaged or engaged partially but farther. On the other hand, when in this case the starting torque desired by the driver on starting off is below the limit value, the clutch 4 arranged between the internal combustion engine 2 and the electric motor 3 is either held at its filling pressure or even emptied to below its filling pressure, and in that event the clutch 4 is preferably held at the filling pressure for a defined time and only then emptied to below its filling pressure.

In a second variant of the method according to the invention, when the vehicle is at rest the clutch 4 arranged between the internal combustion engine 2 and the electric motor 3 is fully engaged so that if, on starting, the starting torque desired by the driver is above the limit value, then in order to turn over and start the internal combustion engine 2 by the electric motor 3 immediately or directly, the clutch 4 arranged between the internal combustion engine 2 and the electric motor 3 remains fully engaged. In contrast, if in this case the starting torque desired by the driver on starting is below the limit value, the clutch 4 arranged between the internal combustion engine 2 and the electric motor 3 is emptied to or below its filling pressure. In this event the clutch 4 is preferably first emptied to its filling pressure, then held there for a defined time, and only then emptied to below its filling pressure.

In a third variant of the invention, at rest the clutch 4 arranged between the internal combustion engine 2 and the electric motor 3 is partially engaged, i.e. held at a pressure higher than its filling pressure so that it can transmit a torque larger than the drag torque. In this case, when the starting torque desired by the driver for starting is above the limit value the clutch 4 arranged between the internal combustion engine 2 and the electric motor 3 either remains engaged to the same extent, or is engaged completely, or partially but farther than before so that on starting, the internal combustion engine 2 is started up immediately or directly by the electric motor 3. On the other hand, when in this case the starting torque desired by the driver for starting is below the limit value, the clutch 4 arranged between the internal combustion engine 2 and the electric motor 3 is emptied to or below its filling pressure and here again the clutch 4 is preferably first emptied to its filling pressure, then held at the filling pressure for a defined time and only then emptied to below its filling pressure.

All these variants of the invention have it in common that the time taken for the electric motor 3 to start up the internal combustion engine 2 when the vehicle is being started from rest can be made very much shorter, since in each case the times required for filling the clutch 4 to its filling pressure and for synchronizing the speeds of the internal combustion engine 2 and the electric motor 3 can be saved.

If an auxiliary hydraulic pump is associated with the transmission 5, the clutch 4 arranged between the internal combustion engine 2 and the electric motor 3, together with transmission-internal shifting elements 5, can be engaged with the help of the auxiliary hydraulic pump while the vehicle is at rest and the internal combustion engine 2 is off.

Likewise, it is possible for the drivetrain to comprise a pulse reservoir that can be filled by a main hydraulic pump of the transmission 5, with the help of which the clutch 4 arranged between the internal combustion engine 2 and the electric motor 3 can then be filled while the vehicle is at rest.

INDEXES

1 Drivetrain
2 Internal combustion engine
3 Electric motor
4 Clutch
5 Transmission
6 Drive output
7 Clutch/Starting element external to the transmission
8 Drivetrain
9 Transmission-internal starting element

The invention claimed is:

1. A method of operating a drivetrain of a motor vehicle in which the drivetrain comprises at least a hybrid drive with an internal combustion engine and an electric motor, a clutch being arranged between the internal combustion engine and the electric motor, and a transmission being arranged between the hybrid drive and a drive output, the method comprising the steps of:

filling the clutch arranged between the internal combustion engine and the electric motor, when the motor vehicle is at rest, with a filling pressure at least up to a touch-point such that the clutch, arranged between the internal combustion engine and the electric motor, transmits at least a drag torque and then, when movement of the motor vehicle is desired;

if a starting torque desired by a driver of the motor vehicle is above a limit value, then either further partially engaging or completely engaging the clutch, arranged between the internal combustion engine and the electric motor, such that the internal combustion engine is immediately turned over and started up by the electric motor; and neglecting to turn over and start the internal combustion engine with the electric motor if the starting torque, desired by the driver when the vehicle is started, is below the limit value.

2. The method according to claim 1, further comprising the step of either maintaining the filling pressure or reducing the filling pressure to below the filling pressure of the clutch, arranged between the internal combustion engine and the electric motor, when starting off in the event that the starting torque desired by the driver is below the limit value.

3. The method according to claim 2, further comprising the step of holding the clutch, arranged between the internal combustion engine and the electric motor, at the filling pressure, for a defined time, and then reducing the filling pressure to below the filling pressure.

4. The method according to claim 1, further comprising the step of fully engaging the clutch, arranged between the internal combustion engine and the electric motor, when the motor vehicle is at rest and then, when starting off, if the starting torque desired by the driver is above the limit value, and maintaining full engagement of the clutch, arranged between the internal combustion engine and the electric motor, such that, on starting the internal combustion engine, the internal combustion engine is immediately started up by the electric motor.

5. The method according to claim 4, further comprising the step of reducing the filling pressure of the clutch, arranged between the internal combustion engine and the electric motor, either down to or below the filling pressure when starting, if the starting torque desired by the driver is below the limit value.

6. The method according to claim 5, further comprising the step of partially emptying the clutch, arranged between the internal combustion engine and the electric motor, to a pressure level of the filling pressure, then holding the clutch, arranged between the internal combustion engine and the electric motor, at the filling pressure for a defined time, and then emptying the clutch, arranged between the internal combustion engine and the electric motor, to a level below the filling pressure.

7. The method according to claim 1, further comprising the step of partially engaging the clutch, arranged between the internal combustion engine and the electric motor, with the motor vehicle at rest with a pressure above the filling pressure such that the clutch, arranged between the internal combustion engine and the electric motor, transmits torque larger than the drag torque and then, when starting off, if the starting torque desired by the driver is above the limit value, allowing the clutch, arranged between the internal combustion engine and the electric motor, either to remain engaged to a same extent or to partially engage farther such that, on starting, the internal combustion engine is immediately started up by the electric motor.

8. The method according to claim 7, further comprising the step of emptying the clutch, arranged between the internal combustion engine and the electric motor, either to or below the filling pressure when starting the internal combustion engine, if the starting torque desired by the driver is below the limit value.

9. The method according to claim 8, further comprising the step of partially emptying the clutch, arranged between the internal combustion engine and the electric motor, down to a level of the filling pressure, then holding the clutch, arranged between the internal combustion engine and the electric motor, at the filling pressure for a defined time, and then emptying the clutch, arranged between the internal combustion engine and the electric motor, to a level below the filling pressure.

* * * * *